March 13, 1934. G. ZECHER 1,951,116
ELECTRIC DISCHARGE TUBE FOR THE EMISSION OF RAYS OF LIGHT
Filed Dec. 12, 1930
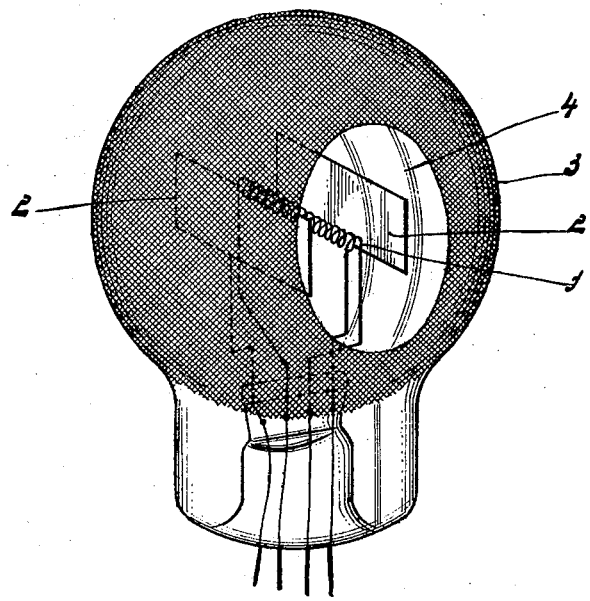
Inventor.
Gustav Zecher
By Lee B. Lemon
Atty.

Patented Mar. 13, 1934

1,951,116

UNITED STATES PATENT OFFICE 1,951,116

ELECTRIC DISCHARGE TUBE FOR THE EMISSION OF RAYS OF LIGHT

Gustav Zecher, Eindhoven, Netherlands, assignor, by mesne assignments, to General Electric Company, a corporation of New York Application December 12, 1930, Serial No. 501,973
In the Netherlands February 12, 1930

5 Claims. (Cl. 250—35)

When use is made of electric discharge tubes for emitting light rays, for example ultraviolet rays, it is often desirable to throw the rays in a determined direction. For example, if a discharge tube emitting ultraviolet rays is utilized for the irradiation of an object with ultraviolet light, it is advisable to concentrate the ultraviolet rays on this object owing to which the active effect of the irradiation is enhanced while other objects in the neighbourhood of the discharge tube are exposed as little as possible to the action of the ultraviolet rays.

It has therefore previously been proposed to surround such a discharge tube partly with a reflector whereby the rays emerging from the tube are reflected as a concentrated beam of light.

The invention relates to an electric discharge tube suitable for the emission of light rays and it has for its object such a discharge tube constructed in such manner that concentration of the rays generated is obtained in a very simple manner.

In an electric discharge tube according to the invention, part of the inner side of the wall of the tube is provided with a mirror which forces the rays produced in the discharge tube to pass to the outside through that portion of the wall which is not covered by the mirror so that a concentrated beam of light is obtained. The discharge tube occupies less space than the installation with a reflector utilized before while due to the fact that the rays are reflected within the tube, they will be less absorbed.

For generating ultraviolet rays use is frequently made of a mercury vapour discharge. The mirror is made in this case of a material which reflects ultraviolet rays, for example of chromium, nickel or aluminium, and which preferably does not amalgamate with mercury.

In order that the invention may be more readily understood and more easily carried into effect, it will be explained more fully with reference to the accompanying drawing which represents, by way of example, a discharge tube according to the invention.

The discharge tube represented in the drawing serves to generate ultraviolet rays and comprises an incandescent cathode 1 and two anodes 2 while it is filled with a quantity of gas, for example of argon, under a pressure, for example, of some millimetres, some mercury vapour being added to the said gas. The wall 3 of the discharge tube consists of a material transparent to the ultraviolet rays generated in the mercury vapour discharge, for example of quartz or one of the well known ultraviolet transmitting glasses.

The inner side of the wall of the bulb of the discharge tube is coated with a reflecting mirror. This mirror consists of a material which is not harmfully attacked by the gas or the vapour in which the discharge is produced. Besides, this material has been so chosen that it reflects the ultra-violet rays. For example, chromium may be used for this purpose. This metal does not form an amalgam with mercury. In the mirror is left an opening 4 through which the ultraviolet rays produced in the tube can pass to the outside. A concentrated beam of rays is the result thereof, which as above set forth may be of great importance. Due to the fact that the rays are reflected within the discharge tube, the absorption of the rays by the material of the wall of the tube is very slight, which is favourable for the efficiency of the tube.

The chromium mirror may be provided in the tube, for example by evaporating, before the electrodes are introduced into the tube, a chromium or chrome-nickel wire in the exhausted bulb during which operation the window 4 is screened, for example with the aid of a mica plate.

What I claim is:

1. An ultra-violet generating electric discharge device comprising a container, electrodes sealed therein, a gaseous atmosphere therein comprising mercury vapor, said container being adapted to transmit ultra-violet radiations and being covered, in part, internally with a mirror adapted to reflect said ultra-violet radiations, said mirror being of metal inert with respect to said gaseous atmosphere.

2. An ultra-violet generating electric discharge device comprising a container, electrodes sealed therein, a gaseous atmosphere therein compressing mercury vapor, said container being adapted to transmit ultra-violet radiations and being covered, in part, internally with a mirror of chromium to reflect said ultra-violet radiations.

3. An electric discharge device comprising a container, electrodes sealed therein, a gaseous atmosphere therein comprising mercury vapor, said container being adapted to transmit light radiations and being covered, in part, internally with a mirror adapted to reflect said light radiations, said mirror consisting of a metal of low atomic weight and inert with respect to the gaseous atmosphere.

4. An ultra-violet generating electric discharge device comprising a container, electrodes sealed therein, a gaseous atmosphere therein comprising mercury vapor, said container being adapted to transmit ultra-violet radiations and being covered, in part, internally with a mirror of nickel to reflect said ultra-violet radiations.

5. An ultra-violet generating electric discharge device comprising a container, electrodes sealed therein, a gaseous atmosphere therein comprising mercury vapor, said container being adapted to transmit ultra-violet radiations and being covered, in part, internally with a mirror of aluminum to reflect said ultra-violet radiations.

GUSTAV ZECHER.